(12) United States Patent
Jho et al.

(10) Patent No.: US 8,817,978 B2
(45) Date of Patent: Aug. 26, 2014

(54) ORDER-PRESERVING ENCRYPTION AND DECRYPTION APPARATUS AND METHOD THEREOF

(75) Inventors: Nam-Su Jho, Daejeon (KR); Do Won Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 156 days.

(21) Appl. No.: 13/333,974

(22) Filed: Dec. 21, 2011

(65) Prior Publication Data

US 2012/0163586 A1 Jun. 28, 2012

(30) Foreign Application Priority Data

Dec. 22, 2010 (KR) .......................... 10-2010-0132384

(51) Int. Cl.
 *H04K 1/00* (2006.01)
(52) U.S. Cl.
 USPC .......................................................... 380/28
(58) Field of Classification Search
 USPC .......................................................... 380/28
 See application file for complete search history.

(56) References Cited

U.S. PATENT DOCUMENTS

| | | | |
|---|---|---|---|
| 7,694,134 B2 * | 4/2010 | Witt et al. ..................... | 713/165 |
| 2005/0147240 A1 | 7/2005 | Agrawal et al. | |
| 2005/0147246 A1 * | 7/2005 | Agrawal et al. ................. | 380/44 |
| 2007/0113104 A1 * | 5/2007 | Witt et al. ..................... | 713/193 |
| 2008/0282096 A1 | 11/2008 | Agrawal et al. | |
| 2009/0190765 A1 * | 7/2009 | Sweazey ....................... | 380/283 |
| 2009/0193254 A1 * | 7/2009 | Sweazey ....................... | 713/175 |
| 2009/0193262 A1 * | 7/2009 | Sweazey ....................... | 713/182 |
| 2009/0193526 A1 * | 7/2009 | Sweazey ....................... | 726/30 |
| 2012/0121080 A1 * | 5/2012 | Kerschbaum ................... | 380/28 |

FOREIGN PATENT DOCUMENTS

KR 1020090055846 A 6/2009

OTHER PUBLICATIONS

Boldyreva et al., Order-Preserving Encryption Revisited: Improved Security Analysis and Alternative Solutions, 2011, Advances in Cryptology—Crypto 2011 Proceedings, Lecture Notes in Computer Science, Ph. Rogaway ed., 2011, p. 1-36.*
Jansen et al., Toward Delay Tolerant Network Anonymity: Threshold Pivot Scheme, 2010, Military Communications Conference (MILCOM), pp. 1-16.*
Alexandra Boldyreva et al., "Order-Preserving Symmetric Encryption", Proc. of Eurocrypt 2009, LNCS 5479, May 2009, pp. 224-241.
Rakesh Agrawal et al., "Order Preserving Encryption for Numeric Data", Proc. of SIGMOD 2004, Jun. 13-18, 2004, pp. 563-574.

* cited by examiner

*Primary Examiner* — Azizul Choudhury
*Assistant Examiner* — Tariq Najee-Ullah

(57) ABSTRACT

An order-preserving encryption apparatus includes an initializer for setting a total space of a ciphertext with respect to a total space of a plaintext by considering security of the ciphertext, and setting a secret key for encryption and a pseudorandom number generator for generation of a pivot. Further, the order-preserving encryption apparatus includes a pivot generator for applying the secret key to the established pseudo-random number generator to generate a pivot for the plaintext to be encrypted. Further, the order-preserving encryption apparatus includes a ciphertext generator for generating information about size of a bit constituting the ciphertext by comparing the generated pivot and the plaintext; and a plaintext adjusting unit for adjusting a magnitude of the total plaintext space and a magnitude of the plaintext according to the ciphertext.

14 Claims, 5 Drawing Sheets

ORDER-PRESERVING ENCRYPTION AND DECRYPTION APPARATUS AND METHOD THEREOF

CROSS-REFERENCE TO RELATED APPLICATION(S)

The present invention claims priority of Korean Patent Application No. 10-2010-0132384, filed on Dec. 22, 2010, which is incorporated herein by reference.

FIELD OF THE INVENTION

The present invention relates to an order-preserving encryption method; and, more particularly, to an order-preserving encryption and decryption apparatus and a method thereof, the apparatus and the method determine a pivot using a pseudo-random number generator and calculate virtual order of a plaintext using the determined pivot, to enable an efficient encryption and decryption.

BACKGROUND OF THE INVENTION

As Information technology advances more and more sophisticated, enterprises and individuals need to process much larger amount of data. Also, resources for managing this large amount data have increased very significantly. However, it is not easy for all members of information technology society to bear necessary cost to manage this large amount of information. Accordingly, external database services are more and more utilized to store information.

However, the external database services have increasing problems of personal information leakage. Therefore, it is important to provide a solution to solve this problem.

Currently, a most attracting solution for this problem is to encrypt every data to be stored in database. An encryption system, which has been a basis of information protection for longtime, ensures the security of encrypted ciphertext.

Meanwhile, a database system provides not only a simple storage of data but also an application environment to search and utilize data in the database. However, since an encrypted data hinders the database system from obtaining any kind of information from itself, the solution encrypting all data to be stored fundamentally blocks application services of database system. To solve this drawback, a lot of studies, from a basic study on a searching method for encrypted database to an advanced study on processing method of performing a desired operation on the encrypted data without decryption, are underway over various areas.

Among various studies as described above, the order-preserving encryption scheme is attracting big attention. This is because many application services that database can provide with are based on order information of data. Efficient searching, size comparing, and range search, and the like are basic application service that can be provided. However, it is contradictory to hide information of a plaintext enough and at the same time open an order-information of the plaintext. Therefore, it is very difficult problem to make an efficient and safe order-preserving encryption scheme, and there is no concrete solution to this problem.

More specifically, in ordinary encryption methods, a plaintext space and a ciphertext space may be constructed identically, but, it is difficult to construct an encryption if selecting the plaintext and ciphertext in the same space in the order-preserving encryption method, since there is none other than a homologous function in this case.

Moreover, ordinary encryption methods generally assume CPA (chosen plaintext attack) or CCA (chosen ciphertext attack) as an attacking scheme to analyze security of the methods, but the order-preserving encryption method does not allow those CPA or CCA attacking schemes because an attacker can perform decryption substantially using those CPA or CCA attacking schemes. For the same reason, it is known to be difficult to construct an open key type order-preserving encryption method.

As described above, the order-preserving encryption is an unsolved problem.

Earlier studies on the order-preserving encryption mainly focused on a scheme in which given plaintext is random-numbered into a cipertext space of larger size.

A systematic study on the order-preserving encryption was done by Agrawal et al. in 2004 for the first time. Agrawal et al. assume a distribution of plaintext as information which is only known to a user, and build an encryption function in order not to open the distribution of the given plaintext after encryption by using the distribution of the given plaintext. They also proposed systematic security and said that in their proposal if an attacker can not infer a distribution of plaintext before an encryption from a given set of ciphertext, the encryption can be defined a secure order-preserving encryption.

However, since above scheme's security is depending on an assumption that user knows all the information on the data to be encrypted before starting encryption, the scheme is far from a practical encryption function.

Later, Boldyreva et al performed a study to apply provable security to the order-preserving function. They proposed a new definition of the provable security for the order-preserving encryption method by using a security definition of a pseudo-random number generating function, beyond a traditional provable security approach for an encryption function. Security of a pseudo-random number function is shown by a fact that a pseudo-random number array generated by a pseudo-random number function can not be distinguished with a real random number array. Similarly, Boldyreva et al defined that an arbitrary order-preserving encryption function can not be distinguished with another arbitrary one.

However, this kind approach is regarded not to satisfy a basic security that an encryption function needs to have. In other words, the basic security that the encryption function needs to have is to ensure that an attacker can not infer information of plaintext from ciphertext.

According to the scheme proposed by the Boldyreva, since an order-preserving function is arbitrarily selected from a set of all possible order-preserving functions, the distribution of entire selected order-preserving functions is same as that of the set of all possible order-preserving functions. That is, an attacker can calculate a distribution of plaintext candidates, into which each ciphertext may decrypted, from the set of all possible order-preserving functions. Here, it can be found that a probability that most of ciphertexts may match with a certain plaintext is very high. The larger the number of plaintexts and ciphertexts is, the more often this phenomenon becomes. Also, more serious problem may occur if admitting a little amount of error.

As discussed above, even though the order-preserving encryption method is a very attention-attracting technology in encryption technology area, a reliabe solution has not been introduced yet.

SUMMARY OF THE INVENTION

In view of the above, the present invention provides an order-preserving encryption and decryption apparatus and a method thereof, the apparatus and the method determine a pivot using pseudo-random number generator and generate a ciphertext using the determined pivot, thereby not imposing burden of storage and calculation on a server.

In accordance with a first aspect of the present invention, there is provided an order-preserving encryption apparatus including an initializer for setting a total space of a ciphertext with respect to a total space of a plaintext by considering security of the ciphertext, and setting a secret key for encryption and a pseudo-random number generator for generation of a pivot; a pivot generator for applying the secret key to the established pseudo-random number generator to generate a pivot for the plaintext to be encrypted; a ciphertext generator for generating information about size of a bit constituting the ciphertext by comparing the generated pivot and the plaintext; and a plaintext adjusting unit for adjusting a magnitude of the total plaintext space and a magnitude of the plaintext according to the ciphertext.

In accordance with a second aspect of the present invention, there is provided an order-preserving encryption method including: establishing a total plaintext space and a total ciphertext space, and establishing a secret key necessary for encryption and a pseudo-random number generator used in generating a pivot; generating the pivot for a plaintext by applying the secret key to the pseudo-random number generator; determining a bit of the ciphertext through comparing the plaintext and the generated pivot; and adjusting a magnitude of the total plaintext space and a magnitude of the plaintext according to the bit of ciphertext determined; wherein the step of generating the pivot is performed based on the magnitude of the total plaintext space adjusted and the magnitude of the plaintext adjusted from a second time on, and wherein the ciphertext is finally completed by repeating the steps from said generating the pivot to said adjusting the magnitude for n times.

In accordance with a third aspect of the present invention, there is provided a decryption apparatus for decrypting a ciphertext encrypted by an order-preserving encryption apparatus, the decryption apparatus including: a decryption pivot generator for generating a decryption pivot by applying a secret key used in the order-preserving encryption apparatus to a pseudo-random number generator; a decryption initializer for initializing a decrypted plaintext and a range of the plaintext by using the decryption pivot and a bit in the ciphertext; and a decrypting unit for decrypting the ciphertext through adjusting the range of the plaintext according to the bit of the ciphertext, wherein the decrypting unit requests the decryption pivot generator to generate a pivot for decrypting a next bit of the ciphertext and receives the pivot generated by the decryption pivot generator, and then adjusts the range which the decrypted plaintext is included using the pivot.

In accordance with a fourth aspect of the present invention, there is provided a decryption method for decrypting a ciphertext encrypted by an order-preserving encryption apparatus, the method including: generating a decrypted plaintext pivot by applying a secret used in the order-preserving encryption apparatus to a pseudo-random number generator; initializing a a space of the plaintext which the decrypted plaintext and a final plaintext is included; calculating a range of the plaintext by using the decryption pivot and a bit of the ciphertext; generating another pivot to be applied to a next bit of the ciphertext when the decrypted bit of the ciphertext is not a last bit; and re-adjusting the decrypted plaintext by using the pivot to be applied to the next bit of the ciphertext, and then perform the steps from the decrypting the plaintext to the adjusting the plaintext repeatedly.

In accordance with an embodiment of the present invention, it is possible to perform an order-preserving encryption on a plaintext and to perform an encryption and decryption by repeatedly using a pseudo-random number generator.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Embodiments of the present invention will be described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Combinations of each step in respective blocks of block diagrams and a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram.

Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective sequences of the sequence diagram.

Moreover, the respective blocks or the respective sequences may indicate modules, segments, or some of codes including at least one executable instruction for executing a specific logical function(s). In several alternative embodiments, is noticed that functions described in the blocks or the sequences may run out of order. For example, two successive blocks and sequences may be substantially executed simultaneously or often in reverse order according to corresponding functions.

Hereinafter, embodiments of the present invention will be described with reference to the accompanying drawings which form a part hereof.

Figure 1:
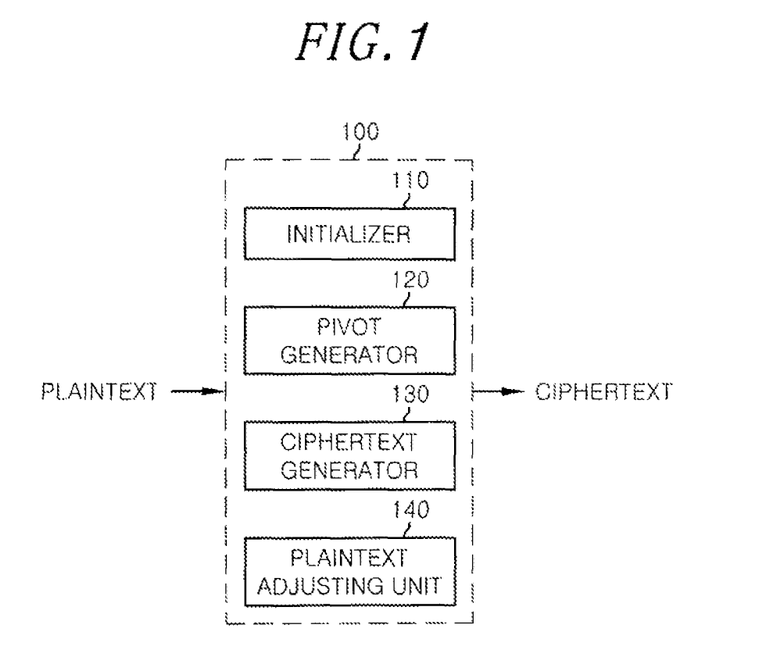
FIG. 1 is a block diagram showing an order-preserving encryption apparatus in accordance with an embodiment of the present invention.

FIG. 1 is a block diagram showing an order-preserving encryption apparatus in accordance with an embodiment of the present invention. The order-preserving encryption apparatus in accordance with the embodiment of the present invention can includes an initializer 110, a pivot generator 120, a ciphertext generator 130, and a plaintext adjusting unit 140.

The initializer 110 provides a plaintext space M and a ciphertext space N (or determines the ciphertext space by input plain text space and security variable), and provide a secret key K needed for encryption and an interface for determining a pseudo-random number generator for generating of a pivot. Here, the plaintext space M and the ciphertext space N can be defined as $M=[1, 2^m]$, $N=[1, 2^n]$, wherein m and n are natural numbers.

The pivot generator 120 applies the secret key K to the pseudo-random number generator determined by the initializer 110, so as to generate a pivot $p_1$ as following equation 1 below for a plaintext a. Here, the generated pivot $p_i$ satisfies $1 \le p_1 \le 2^m$.

$$p_1 = PRNG(K\|1) \quad \text{[Equation 1]}$$

Here, PRNG(·) means a pseudo-random number generator which the symbol '·' is an input. Further, the symbol '∥' represents concentration of two bits.

The ciphertext generator 130 determines a ciphertext through comparing the plaintext 'a' and pivot $p_1$. For example, the ciphertext generator 130 determines a bit of the ciphertext to be 1 when the plaintext a is smaller than pivot $p_1$. Otherwise, the ciphertext generator 130 determines the bit of the ciphertext to be 0.

The plaintext adjusting unit 140 adjusts the plaintext space according to the ciphertext determined by the ciphertext generator 130. In detail, the plaintext adjusting unit 140 adjusts a space of $[p_1, 2^m]$ to be a total plaintext space $[1, 2^m]$ when the bit of the ciphertext is determined to be 1, and adjusts a space of $[1, p_1]$ to be a total plaintext space $[1, 2^m]$ when the bit of the ciphertext is determined to be 0. That is, the plaintext space is divided into two spaces by the pivot and only a space which the plaintext is included remains. Then, the space is re-adjusted to have same size as the total plaintext space.

Meanwhile, the plaintext adjusting unit 140 can adjust not only the plaintext space but also the plaintext 'a' based on the plaintext space.

When the bit of the ciphertext is 0, the plaintext adjusting unit 140 adjusts the plaintext 'a' according to equation 2 below.

$$a' = a * 2^m / p_1 \quad \text{[Equation 2]}$$

When the bit of the ciphertext is 1, the plaintext adjusting unit 140 adjusts the plaintext 'a' according to equation 3 below.

$$a' = (a - p_1) * 2^m / (2^m - p_1) \quad \text{[Equation 3]}$$

Herein, a' is an adjusted plaintext, 'a' is the plaintext, m is a variable representing the total plaintext space, and $p_1$ is the pivot. That is, the plaintext adjusting unit 140 of the order-preserving encryption and decryption apparatus in accordance with an embodiment of the present invention also adjusts the plaintext in the process of adjusting partial space.

The plaintext a' adjusted by the plaintext adjusting unit 140 can be used in generation of a pivot and a ciphertext by the pivot generator 120 and the ciphertext generator 130.

Hereinafter, referring to FIG. 2, an encryption process of a plaintext performed by the order-preserving apparatus 100 having a structure above will be explained.

Figure 2:
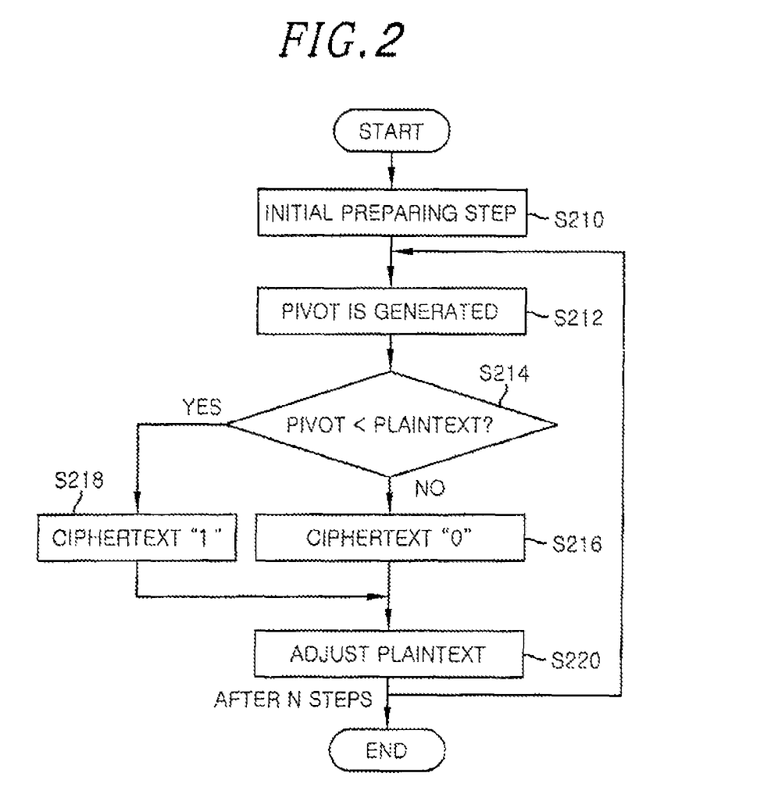
FIG. 2 is a flowchart describing an encryption process of a plaintext by using the order-preserving encryption apparatus in accordance with an embodiment of the present invention.

FIG. 2 is a flowchart describing an encryption process of a plaintext by using the order-preserving encryption apparatus in accordance with an embodiment of the present invention.

As shown in FIG. 2, the order-preserving apparatus 100 can perform an initial preparing step S210 through an operation of the initializer 110.

In the initial preparing step S210, a plaintext space M ($M=[1, 2^m]$) and a ciphertext space N ($N=[1, 2^n]$) are established, and a secret key K needed for encryption and a pseudo-random number generator used in a generation of a pivot.

Next, the order-preserving encryption apparatus 100 performs an encryption step. The encryption step can include a pivot generating step, an encrypting step using the pivot, and a plaintext adjusting step.

First, a pivot $p_1$ is generated by applying the secret key determined in the initial preparing step to the pseudo-random number generator for one plaintext 'a' in step S212.

Next, the encrypting step using the pivot $p_1$ continues. In step S214, the apparatus 100 compares the plaintext 'a' and the pivot $p_1$ to determine whether the plaintext 'a' is smaller than the pivot $p_1$. When the plaintext 'a' is smaller than the pivot $p_1$, the apparatus 100 determines a bit of the ciphertext to be 0 in step 216. Otherwise, the apparatus 100 determines the bit of the ciphertext to be 1 in step S218.

Afterward, the order-preserving encryption apparatus 100 can adjust the plaintext according to the bit of ciphertext determined by the plaintext adjusting unit 140 in step S220.

When the bit of ciphertext is 0, the apparatus 100 adjusts a range of $[1, p_1]$ to a total plaintext space, and adjusts a magnitude of the plaintext by using the equation 2. When the bit of the ciphertext is 1, the apparatus 100 adjusts a range of $[p_1, 2^m]$ to be the total plaintext space, and adjusts the magnitude of the plaintext by using the equation 3.

The apparatus 100 can perform the steps from S212 to S220 for n times, and output each bit of the ciphertext $b_i$ ($1 \le i \le n$) provided in each step.

The pivot pi in the i-th step is as following equation 4.

$$p_i = PRNG(K\|i\|b_1\|b_2\|\ldots\|b_{i-1}) \quad \text{[Equation 4]}$$

Accordingly, a final ciphertext can be "$b_1\|b_2\|\ldots\|b_n$".

Hereinafter, referring FIG. 3, the process of outputting the each bit of the ciphertext $b_i$ (1≤i≤n) provided in each step by performing the steps from S212 to S220 for n times will be explained.

Figure 3:
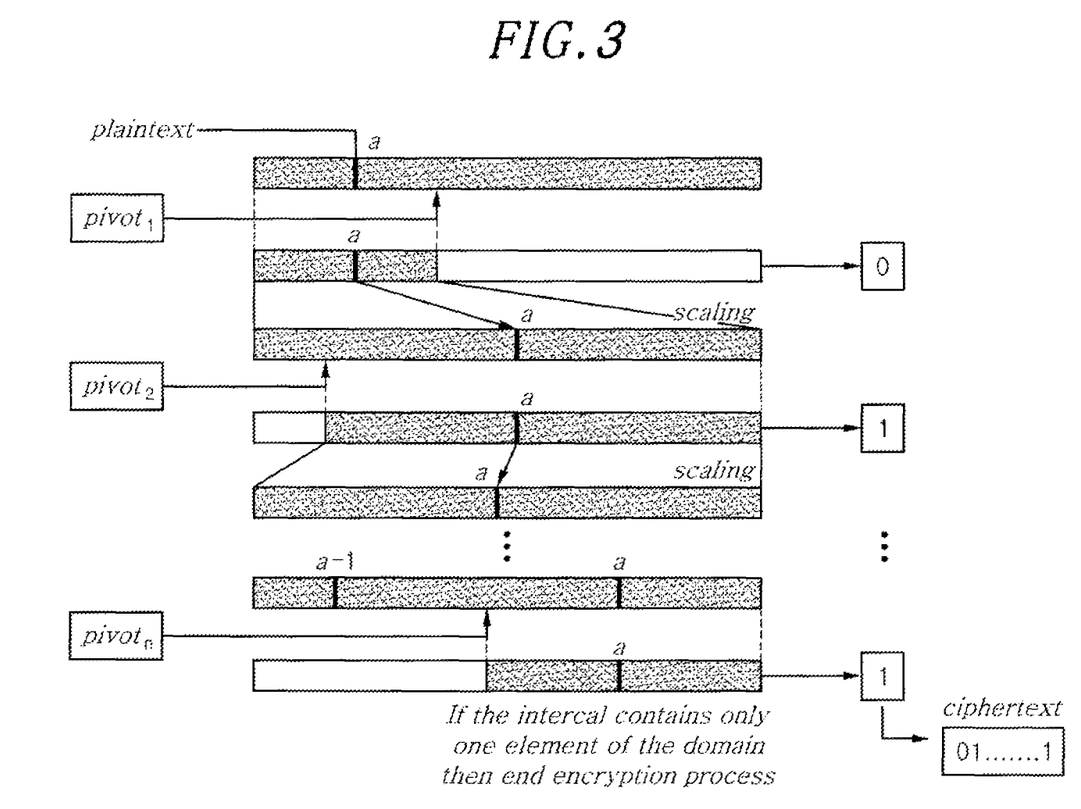
FIG. 3 is a diagram explaining a location change of a plaintext space and a pivot in the encryption process in accordance with an embodiment of the present invention.

FIG. 3 is a diagram explaining a location change of a plaintext space and a pivot in the encryption process in accordance with an embodiment of the present invention.

As described in FIG. 3, the apparatus 100 can generates the pivot $p_1$ when there is a data having a plaintext range $[1, 2^m]$ including the plaintext 'a'. The apparatus 100 generates a first pivot p1 and determines the bit of the ciphertext to be 0 because plaintext 'a' is smaller than the pivot p1, and then adjusts the plaintext range $[1, 2^m]$, and adjusts the plaintext according the adjustment of the plaintext range.

Next, the apparatus 100 generates a second pivot $p_2$ for the adjusted plaintext 'a', and, since the adjusted plaintext 'a' is larger than the second pivot p2, determines the bit of ciphertext to be 1. Then, the apparatus 100 re-adjusts the plaintext range, and the adjusted plaintext 'a'.

Through repeatedly performing above explained steps, the apparatus 100 determines the bit of ciphertext by comparing the adjusted plaintext 'a' and n-th pivot $p_n$, and then finally generates a final ciphertext for the plaintext 'a'.

Hereinafter, an order-preserving decryption apparatus and a method thereof for decrypting a ciphertext encrypted by the encryption method above, referring FIG. 4 and FIG. 5.

Figure 4:
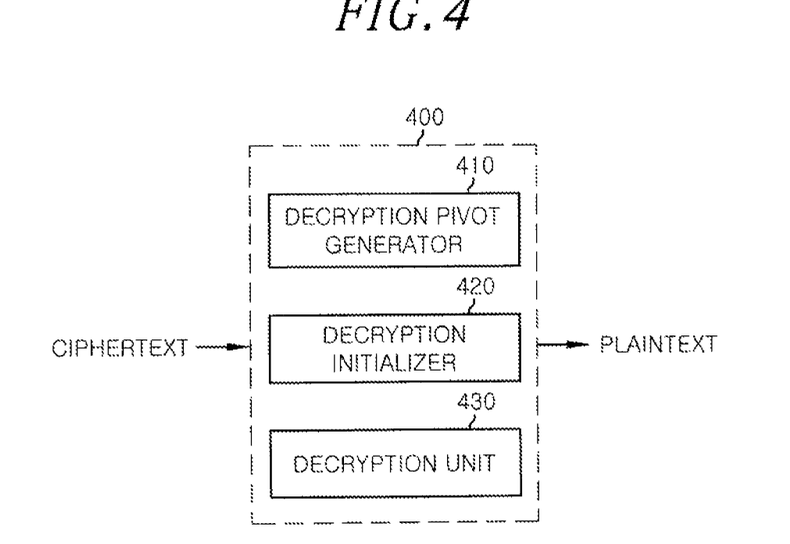
FIG. 4 is a block diagram depicting an order-preserving decryption apparatus in accordance with an embodiment of the present invention.

FIG. 4 is a block diagram depicting an order-preserving decryption apparatus in accordance with an embodiment of the present invention.

Referring the FIG. 4, the decryption apparatus 400 can include a decryption initializer 420, a decryption pivot generator 410, and decrypting unit 430.

A detail structure of the order-preserving decryption apparatus 400 and a decryption process performed by the apparatus 400 will be explained referring FIG. 5.

Figure 5:
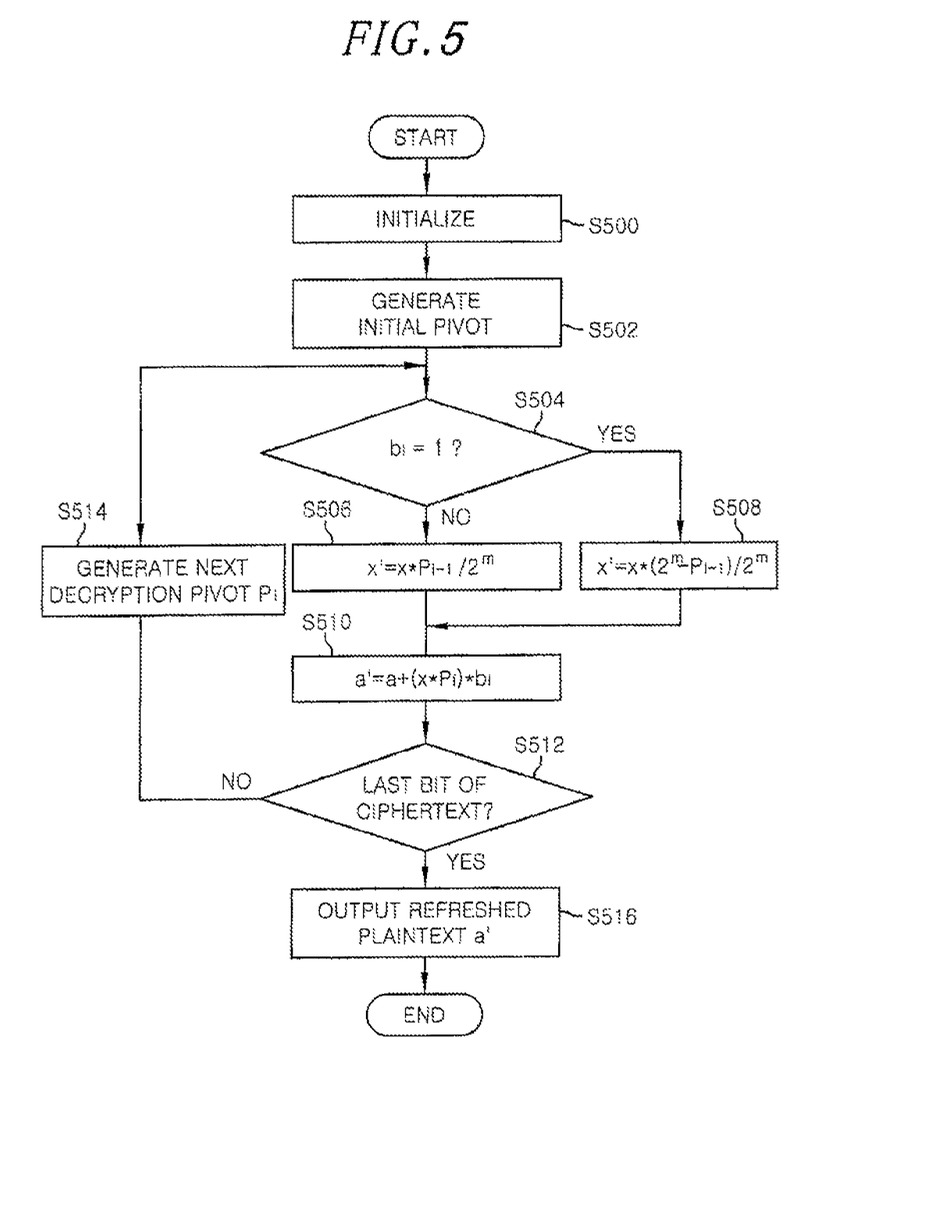
FIG. 5 is flowchart describing an decryption process of a ciphertext by using the order-preserving decryption apparatus in accordance with an embodiment of the present invention.

FIG. 5 is flow chart describing an decryption process of a ciphertext by using the order-preserving decryption apparatus in accordance with an embodiment of the present invention.

The decryption initializer 420 is for initializing a size x of range which a plaintext 'a' and a final plaintext exist. Further, the decryption initializer 420 initialize the plaintext space M to be $[1, 2^a]$, the plain text 'a' to be "$p_1*b_1$", and a plaintext space x to be "$2^a$" in step S500.

The decryption pivot generator 410 generates a decryption pivot $p_1$ by applying a secret key K to a pseudo-random number generator with the same scheme of the order-preserving encryption apparatus 100 in step S502. Here, the decryption pivot $p_1$ is for decryption of a first bit of the ciphertext.

Next, the decrypting unit 430 determines whether the first bit of the ciphertext $b_i$ is 1 in step S504. Based on a result of the step S504, when the bit of the ciphertext is not 1 (i.e., 0), the decrypting unit 430 refreshes the plaintext space x as a following equation 5 in step S506. When the bit of the ciphertext is 1, the decrypting unit 430 refreshes the decrypted plaintext x as a following equation 6 in step S508.

$$x'=x*p_{i-1}/2^m (2 \leq i \leq n),$$ [Equation 5]

$$x'=x*(2^m-p_{i-1})/2^m (2 \leq i \leq n),$$ [Equation 6]

wherein $p_{i-1}$ is the decryption pivot, and x is range of an original plaintext, and x' is range of a refreshed plaintext.

Then, the decrypting unit 430 re-adjusts the plaintext by using the next decryption pivot $p_i$ applied to the next bit. In detail, the decrypting unit 430 refreshes the plaintext 'a' by using the equation 7 below in step S510.

$$a'=a+(x*p_i)*b_i (2 \leq i \leq n),$$ [Equation 7]

wherein 'a' is an original plaintext, a' is a refreshed plaintext, $p_i$ is the decryption pivot of i-th bit of the ciphertext, x is the range of the plaintext, and $b_i$ is i-th bit of the ciphertext.

Thereafter, the order-preserving apparatus 400 determines whether the bit of the ciphertext decrypted by the decrypting unit 430 is the last bit in step S512. According to a result of the step S512, if the bit of the ciphertext is not the last one, the apparatus 400 request a generation of a pivot to the decryption pivot generator 410.

Accordingly, the pivot generator 410 generates a next decryption pivot $p_i$, and provides the generated next decryption pivot $p_i$ to the decrypting unit 430 in step S512.

Next, a control step goes back to step S504 and repeats steps S504 to S510.

According to a result of the step S512, if the bit of the ciphertext is the last one, the apparatus 400 outputs refreshed plaintext a' through the decrypting unit 430 in step S516 and the control step ends.

While the invention has been shown and described with respect to the embodiments, it will be understood by those skilled in the art that various changes and modification may be made without departing from the scope of the invention as defined in the following claims.

What is claimed is:

1. An order-preserving encryption apparatus comprising:
an initializer for setting a total space of a ciphertext with respect to a total space of a plaintext by considering security of the ciphertext, and setting a secret key for encryption and a pseudo-random number generator for generation of a pivot point;
a pivot point generator for applying the secret key to the established pseudo-random number generator to generate a pivot point for the plaintext to be encrypted;
a ciphertext generator for generating information about size of a bit constituting the ciphertext by comparing the generated pivot point and the plaintext; and
a plaintext adjusting unit for
dividing a total plaintext space using the pivot point,
adjusting, to a total magnitude of plaintext space, a portion of the divided total plaintext space resulting in an adjusted total plaintext space, and
adjusting the plaintext,
wherein the ciphertext is completed by repeating from said generating the pivot point to said adjusting the plaintext for n times, said generating the pivot point performed after the resulting adjusted total plaintext space is determined from the previous round,
where n is the total length of the ciphertext in bits.

2. The apparatus of claim 1, wherein the ciphertext generator generates the ciphertext by setting the bit of ciphertext to be 1 when the generated pivot point is less than the plaintext, and by setting the bit of the ciphertext to be 0 when the generated pivot point is equal to or larger than the plaintext.

3. The apparatus of claim 2, wherein the plaintext adjusting unit adjusts a range from an initial part of the total plaintext space to a point of the generated pivot point to be the total plaintext space when the bit of the ciphertext is 0, and adjusts a range from the point of the generated pivot point to a final part of the total plaintext space to be the total plaintext space when the bit of the ciphertext is 1.

4. The apparatus of claim 3, wherein the plaintext adjusting unit adjusts the magnitude of the plaintext according to following equation when the bit of the ciphertext is 0, $$a'=a*2^m/p_1$$

wherein a' is the adjusted plaintext, 'a' is an original plaintext, m is a variable representing the total space of the plaintext, and $p_1$ is the pivot point, and the plaintext adjusting unit adjusts the magnitude of the plaintext according to following equation when the bit of the ciphertext is 1, $$a'=(a-p_1)*2^m/(2^m-p_1)$$

wherein a' is the plaintext adjusted, 'a' is the plaintext, m is a variable representing the total plaintext space, and $p_1$ is the pivot point.

5. An order-preserving encryption method comprising:
establishing a total plaintext space and a total ciphertext space, and establishing a secret key necessary for encryption and a pseudo-random number generator used in generating a pivot point;
generating the pivot point for a plaintext by applying the secret key to the pseudo-random number generator;
determining a bit of the ciphertext through comparing the plaintext and the generated pivot point;
dividing the total plaintext space using the pivot point;
adjusting, to a total magnitude of plaintext space, a portion of the divided total plaintext space resulting in an adjusted total plaintext space; and
adjusting the plaintext,
wherein the ciphertext is completed by repeating from said generating the pivot point to said adjusting the plaintext for n times, said generating the pivot point performed after the resulting adjusted total plaintext space is determined from the previous round,
where n is the total length of the ciphertext in bits.

6. The method of claim 5, wherein said determining the bit of the ciphertext includes:
setting the bit of ciphertext to be 0 when the generated pivot point is smaller than the plaintext, and setting the bit of ciphertext to be 1 when the generated pivot point is equal to or larger than the plaintext.

7. The method of claim 6, wherein said adjusting the magnitude includes:
adjusting a range from an initial part of the total plaintext space to a point of said pivot point generated to be the total plaintext space when the bit of the ciphertext is 0, and adjusting a range from the point of said pivot point generated to a final part of the total plaintext space to be the total plaintext space when the bit of the ciphertext is 1.

8. The method of claim 7, wherein said adjusting the magnitude includes:
adjusting the magnitude of the plaintext according to following equation when the bit of the ciphertext is 0, $$a'=a*2^m/p_1$$

wherein a' is the adjusted plaintext, 'a' is the plaintext, m is a variable representing the total plaintext space, and $p_1$ is the pivot point, and
adjusting the magnitude of the plaintext according to following equation when the bit of the ciphertext is 1, $$a'=(a-p_1)*2^m/(2^m-p_1)$$

wherein a' is the plaintext adjusted, 'a' is the plaintext, m is a variable representing the total plaintext space, and $p_1$ is the pivot point.

9. A decryption apparatus for decrypting a ciphertext encrypted by an order-preserving encryption apparatus, the decryption apparatus comprising:

a decryption pivot point generator for generating a decryption pivot point by applying a secret key used in the order-preserving encryption apparatus to a pseudo-random number generator;
a decryption initializer for initializing a decrypted plaintext and a range of the plaintext by using the decryption pivot point and a bit in the ciphertext; and
a decrypting unit for decrypting the ciphertext through adjusting the of the plaintext according to the bit of the ciphertext, wherein the decrypting unit requests the decryption pivot point generator to generate a pivot point for decrypting a next bit of the ciphertext and receives the pivot point generated by the decryption pivot point generator, and then adjusts the which the decrypted plaintext is included using the pivot point and adjusts the decrypted plaintext,
wherein the decryption is completed by repeating from generating the pivot point to adjusting the decrypted plaintext for n times, the generating the pivot point performed after the resulting adjusted decrypted plaintext is determined from the previous round,
where n is the total length of the ciphertext in bits.

10. The apparatus of claim 9, wherein the decrypting unit refreshes the decrypted plaintext as following equation when the bit of the ciphertext is 0, $$x'=x*p_{i-1}/2^m,$$

wherein $2 \le i \le n$, $p_{i-1}$ is the decryption pivot point, and x is range of an original plaintext, and x' is range of a refreshed plaintext,
where i is variable representing the place between 2 and n, and m is a variable representing the total plaintext space,
wherein the decrypting unit refreshes the decrypted plaintext as following equation when the bit of the ciphertext is 1, $$x'=x*(2^m-p_{i-1})/2^m,$$

wherein $2 \le i \le n$, $p_{i-1}$ is the decryption pivot point, and x is the range of the original plaintext, x' is the range of the refreshed plaintext,
where i is variable representing the place between 2 and n, and m is a variable representing the total plaintext space.

11. The apparatus of claim 9, wherein the decrypting unit calculates the decrypted plaintext as following equation, $$a'=a+(x*p_i)*b_i$$

wherein $2 \le i \le n$, a is an original plaintext, a' is a refreshed plaintext, $p_i$ is the decryption pivot point of i-th bit of the ciphertext, x is the range of the plaintext, and $b_i$ is i-th bit of the ciphertext,
where i is variable representing the place between 2 and n, a' is the adjusted plaintext, and 'a' is the plaintext.

12. A decryption method for decrypting a ciphertext encrypted by an order-preserving encryption apparatus, the method comprising:
generating a decrypted plaintext pivot point by applying a secret used in the order-preserving encryption apparatus to a pseudo-random number generator;
initializing a space of the plaintext which the decrypted plaintext and a final plaintext is included;
calculating a range of the plaintext by using the decryption pivot point and a bit of the ciphertext;
generating another pivot point to be applied to a next bit of the ciphertext when the decrypted bit of the ciphertext is not a last bit; and
re-adjusting the decrypted plaintext by using the pivot point to be applied to the next bit of the ciphertext, wherein the decryption is completed by repeating from generating the pivot point to adjusting the decrypted plaintext for n times, the generating the pivot point performed after the resulting adjusted decrypted plaintext is determined from the previous round, wherein n is the total length of the ciphertext in bits.

13. The method of claim 12, wherein said decrypting includes:

refreshing the range of the plaintext as following equation when the bit of the ciphertext is 0, $$x'=x*p_{i-1}/2^m$$

wherein $2 \leq i \leq n$, $p_i{-}_1$ is the decryption pivot point, x is the range of the plaintext, and x' is the range of the refreshed plaintext, where i is variable representing the place between 2 and n, and m is a variable representing the total plaintext space, and refreshing the decrypted plaintext as following equation when the bit of the ciphertext is 1, $$x'=x*(2^m-p_{i-1})/2^m,$$

wherein $2 \leq i \leq n$, $p_i{-}_1$ is the decryption pivot point, x is the range of the plaintext and x' is the refreshed range of the plaintext, where i is variable representing the place between 2 and n, and m is a variable representing the total plaintext space.

14. The method of claim 12, wherein the decryped plaintext is re-adjusted as following equation, $$a'=a+(x*p_i)*b_i$$

wherein $2 \leq i \leq n$, a is the plaitext, a' is the refreshed plaintext, $p_i$ is the pivot point for decryption of i-th bit of the ciphertext, x is the range of the plaintext, and $b_i$ is i-th bit of the ciphertext, where i is variable representing the place between 2 and n, a' is the adjusted plaintext, and 'a' is the plaintext.

* * * * *